(12) United States Patent
Watanabe et al.

(10) Patent No.: US 8,488,262 B2
(45) Date of Patent: Jul. 16, 2013

(54) LENS DRIVING DEVICE

(75) Inventors: Hiroyuki Watanabe, Shiroi (JP); Hiroki Ito, Itabashi-ku (JP)

(73) Assignee: Nidec Copal Corporation, Tokyo (JP)

( * ) Notice: Subject to any disclaimer, the term of this patent is extended or adjusted under 35 U.S.C. 154(b) by 0 days.

(21) Appl. No.: 13/304,436

(22) Filed: Nov. 25, 2011

(65) Prior Publication Data

US 2012/0134033 A1    May 31, 2012

(30) Foreign Application Priority Data

Nov. 26, 2010    (JP) ................. 2010-264100

(51) Int. Cl.
*G02B 7/02*    (2006.01)
*G02B 15/14*    (2006.01)

(52) U.S. Cl.
USPC ........ 359/824; 359/814; 359/696; 310/12.02; 310/112; 348/345; 396/133

(58) Field of Classification Search
USPC ......... 359/811, 814, 819, 823, 824, 694–698; 310/12.02, 12.27, 13–15, 49.32, 112; 348/335, 348/345, 349, 357; 396/55, 133, 144
See application file for complete search history.

(56) References Cited

U.S. PATENT DOCUMENTS

| | | | | |
|---|---|---|---|---|
| 5,499,143 A | * | 3/1996 | Sakamoto et al. | 359/824 |
| 5,612,740 A | * | 3/1997 | Lee et al. | 348/345 |
| 6,856,469 B2 | * | 2/2005 | Yoneyama et al. | 359/696 |
| 7,233,449 B2 | * | 6/2007 | Suemori et al. | 359/824 |
| 7,440,201 B2 | * | 10/2008 | Tsuruta et al. | 359/824 |
| 7,728,705 B2 | * | 6/2010 | Wang et al. | 335/229 |
| 7,777,978 B2 | * | 8/2010 | Sato | 359/824 |
| 7,990,625 B2 | * | 8/2011 | Ke | 359/696 |
| 8,213,100 B2 | * | 7/2012 | Wade et al. | 359/824 |

FOREIGN PATENT DOCUMENTS

| | | |
|---|---|---|
| JP | 3124292 | 7/2006 |
| JP | 2007-139810 | 6/2007 |

* cited by examiner

*Primary Examiner* — Loha Ben
(74) *Attorney, Agent, or Firm* — Wenderoth, Lind & Ponack, L.L.P.

(57) ABSTRACT

In a lens driving device, magnetic attraction plates that are magnetic bodies are disposed on a fixed frame at both ends of a movement region of a movable unit. Therefore, when the movable unit moves in the fixed frame to one side or to the other side in the fixed frame and reaches a position at either end of the fixed frame, magnets on the movable unit are magnetically attracted to the magnetic attraction plates on the fixed frame continuously. As a result, the movable unit can be retained at the position even when the coil becomes de-energized.

1 Claim, 7 Drawing Sheets

LENS DRIVING DEVICE

CROSS REFERENCES TO RELATED APPLICATIONS

The present invention contains subject matter related to Japanese Patent Application No. 2010-264100 filed in the Japan Patent Office on Nov. 26, 2010, the entire contents of which are incorporated herein by reference.

BACKGROUND OF THE INVENTION

1. Field of the Invention

The present invention relates to a lens driving device that is mounted in a mobile apparatus, a mobile phone, or a lens barrel of a camera and that is used as an autofocus lens module.

2. Description of the Related Art

Japanese Registered Utility Model No. 3124292 describes an existing technology in this field. A lens driving device according to this utility model includes a fixed frame having a bottom lid and an upper lid. Support portions stand at four corners of the bottom lid, and the upper lid is disposed more inward than the support portions. Magnets are fixed to four corners of the fixed frame. A movable unit including a lens holder is disposed in the fixed frame, and a lens and a coil are fixed to the lens holder. A helical spring that urges the movable unit in one direction is disposed in the fixed frame, and the movable unit is disposed inside the helical spring. In such a lens driving device, the movable unit moves toward one end of the fixed frame against the urging force of the helical spring when the coil of the movable unit is energized. The movable unit is retained at the other end of the fixed frame due to the urging force of the helical spring when the coil is in a de-energized state. (See also Japanese Unexamined Patent Application Publication No. 2007-139810.)

SUMMARY OF THE INVENTION

However, the existing lens driving device described above has a problem in that the lens driving device consumes electric power while retaining the position of the movable unit because the coil needs to be continuously energized so that the movable unit can be retained at the one end of the fixed frame, although the movable unit can be retained at the other end of the fixed frame using the helical spring when the coil is in a de-energized state.

The present invention provides a lens driving device that enables, with a simple structure, retention of the position of a movable unit in a de-energized state when the movable unit reciprocates.

According to the present invention, there is provided a lens driving device including a lens, a movable unit that holds the lens, and a fixed frame that holds the movable unit in such a way that the movable unit is linearly movable. The movable unit is provided with a magnet that extends along a movement direction of the movable unit. The fixed frame is provided with a coil and magnetic bodies, the coil is disposed so as to face the magnet, and the magnetic bodies are disposed at both ends of a movement region of the movable unit.

In the lens driving device, the magnetic bodies are disposed on a fixed frame at both ends of the movement region of the movable unit. Therefore, when the movable unit moves in the fixed frame to one side or to the other side in the fixed frame and reaches a position at either end of the fixed frame, the magnets on the movable unit are magnetically attracted to the magnetic bodies on the fixed frame continuously. As a result, the movable unit can be retained at the position even when the coil becomes de-energized. Moreover, the lens driving device, in which the magnets are mounted on the movable unit, is of a moving magnet type. Therefore, wires connected to the coil are disposed on the fixed frame side, and thereby breakage of the wires can be prevented and the structure can be easily simplified. Moreover, it is not necessary to provide a space for containing a helical spring in the fixed frame as in existing devices, so that the size of the fixed frame can be reduced by the volume of the space. This is extremely advantageous in reducing the size of the lens driving device.

It is preferable that the fixed frame have openings at both ends of the movement region of the movable unit, and magnetic attraction plates that are the magnetic bodies be fixed to the fixed frame so as to surround the openings in the fixed frame.

In this case, the space occupied by the magnetic bodies can be minimized because the magnetic bodies have plate-like shapes, which is advantageous in reducing the size of the lens driving device. Moreover, because the magnetic attraction plates are disposed so as to surround the openings in the fixed frame, the size of the magnetic attraction plates can be increased, and thereby magnetic attraction to the magnets 7 of the movable unit can be increased. Thus, the position of the movable unit can be retained more securely.

It is preferable that the openings on both sides of the fixed frame be connected to each other through a movable unit passage, guide members be disposed in the movable unit passage so as to extend parallel to each other in the movement direction of the movable unit, and the movable unit slide along the guide members.

In this case, the movable unit can be moved smoothly by using the guide pins, and the movable unit can be prevented from being freely moved in the fixed frame when a drop impact is applied to the lens driving device. Thus, the movable unit can be moved speedily, and breakage of the movable unit and fixed frame can be prevented.

It is preferable that the movable unit passage have a rectangular sectional shape with chamfered corners, chamfered portions of the movable unit passage be positioned symmetric about a central axis of the movable unit passage, the guide members be disposed in the chamfered portions, and the movable unit have an external shape that substantially coincides with the sectional shape of the movable unit passage.

In this case, because the movable unit passage has a rectangular sectional shape with chamfered corners and the movable unit has an external shape that substantially coincides with the sectional shape of the movable unit passage, the movable unit is not likely to rotate around the optical axis in the movable unit passage, and therefore optical axis displacement can be avoided. Moreover, because the guide pins are disposed in the chamfered portions of the movable unit passage, the space occupied by the guide pins can be appropriately reduced. This is extremely advantageous in reducing the size of the lens driving device.

With the present invention, retention of the position of a movable unit in a de-energized state when the movable unit reciprocates can be realized with a simple structure.

DESCRIPTION OF THE PREFERRED EMBODIMENTS

Figure 1:
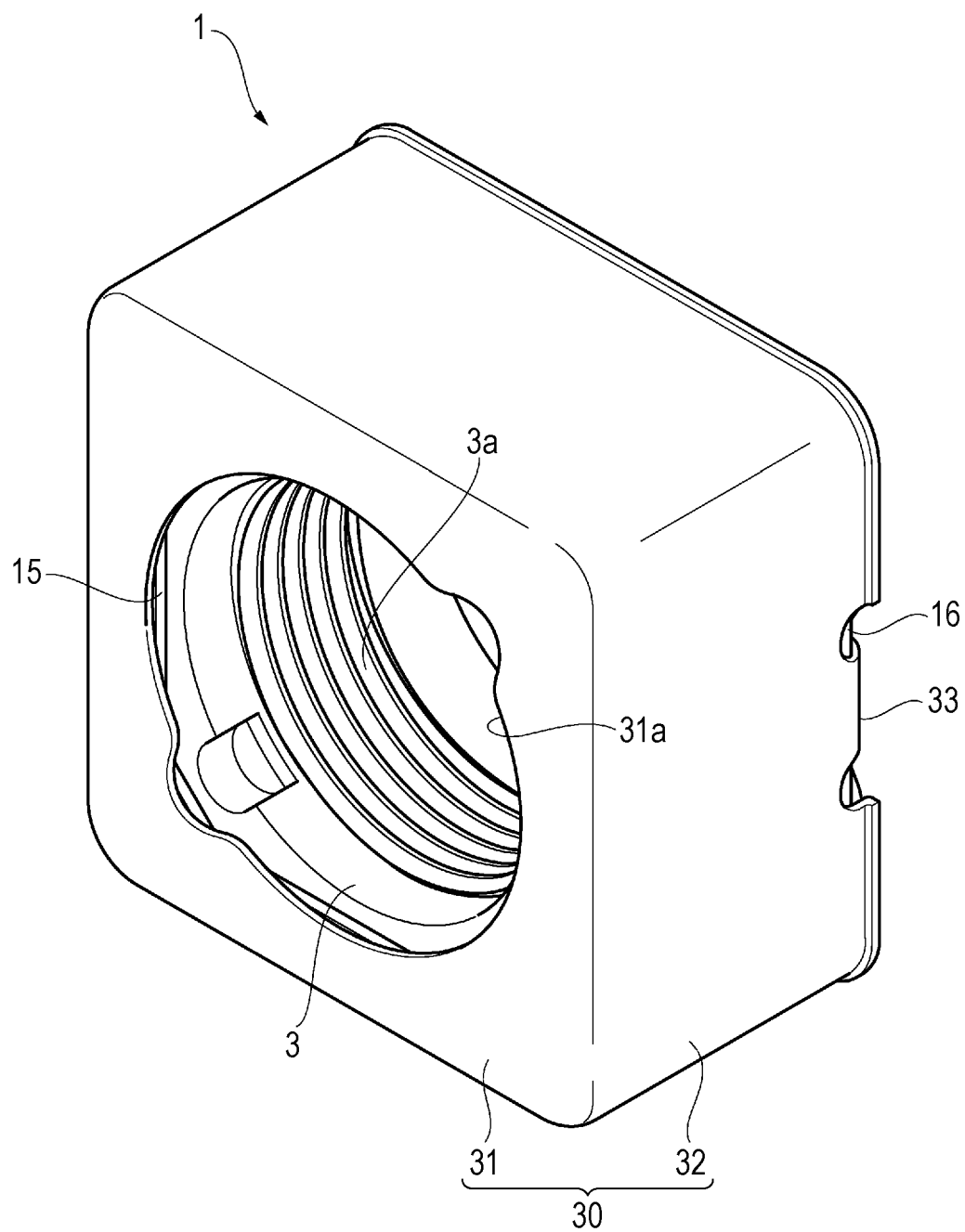
FIG. 1 is a perspective view of a lens driving device according to an embodiment the present invention.
Figure 2:
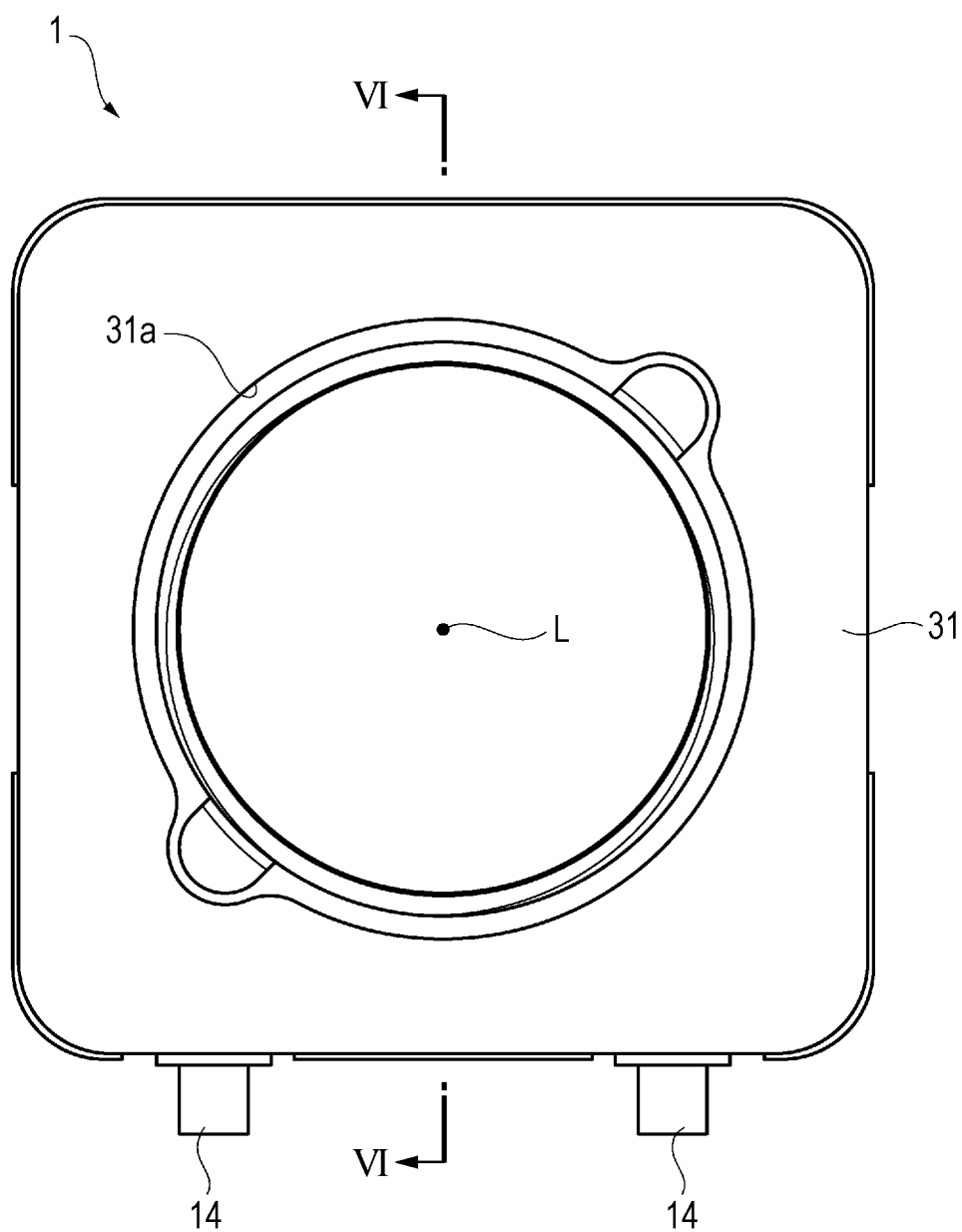
FIG. 2 is a front view of the lens driving device illustrated in FIG. 1.
Figure 3:
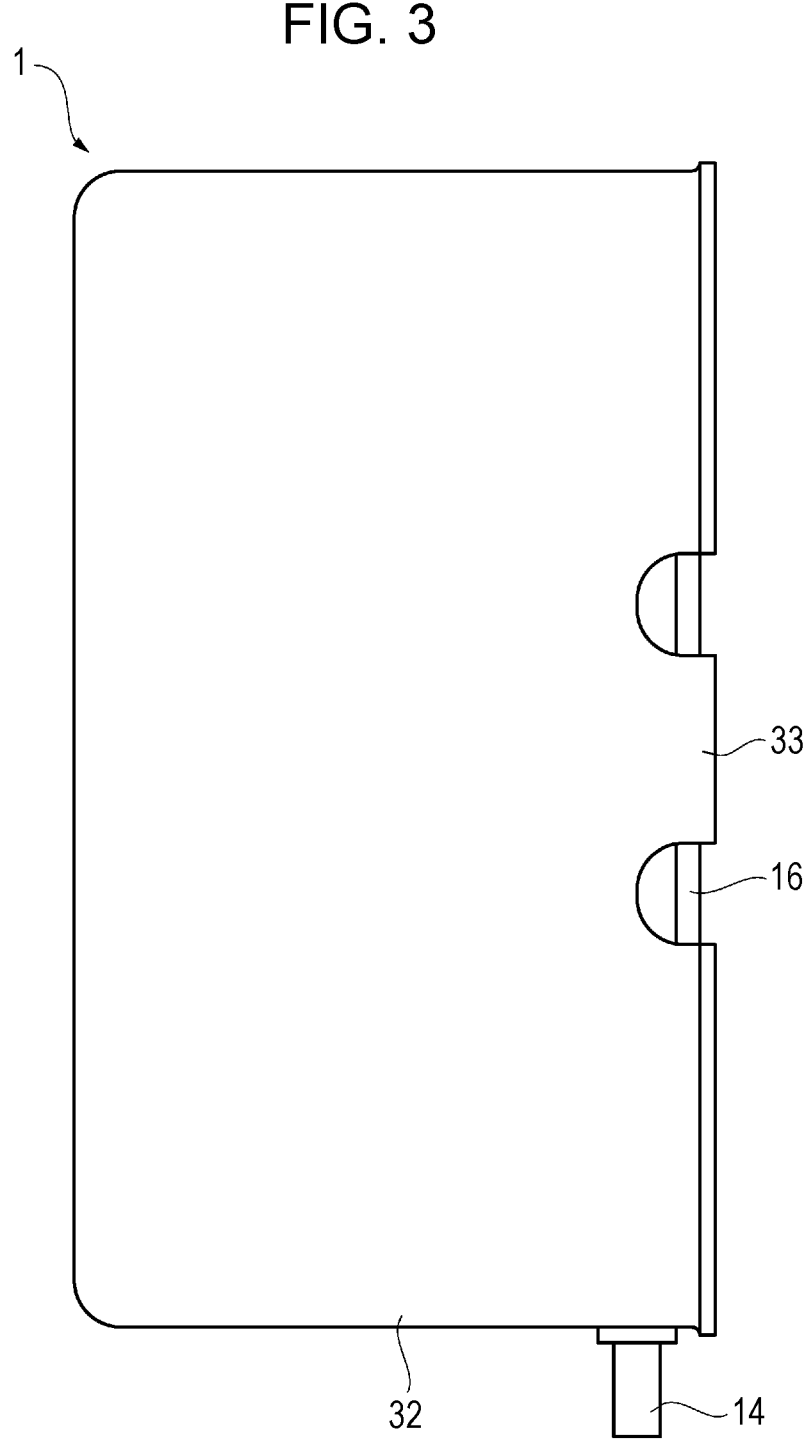
FIG. 3 is a side view of the lens driving device illustrated in FIG. 1.

Hereinafter, an embodiment of a lens driving device according to the present invention will be described in detail.

Referring to FIGS. 1 to 4, a lens driving device 1 includes a movable unit 3 to which a lens 2 is fixed and a fixed frame 4 in which the movable unit 3 linearly moves. The lens driving device 1 is used as a small autofocus lens module. The lens 2 is disposed in a cylindrical lens barrel 6. A male thread 6a is formed on the outer peripheral surface of the lens barrel 6.

The movable unit 3, to which the lens barrel 6 is fixed, is made of a resin and has a hollow rectangular shape with chamfered corner portions R. Recesses 3b for holding four rectangular plate magnets 7 are formed in the outer peripheral surface of the movable unit 3. At the center of the movable unit 3, a lens mount hole 3c is formed so as to extend in the direction of the optical axis L. A female thread 3a is formed on the wall surface of the lens mount hole 3c. The male thread 6a, which is formed on the outer periphery of the lens barrel 6, is screwed into the female thread 3c.

Each of the magnets 7, which each has a south pole and a north pole that are arranged in a direction perpendicular to the optical axis L, extends in the direction of the optical axis L, i.e., along the movement direction of the movable unit 3. The magnets 7 are mounted in the recesses 3b of the movable unit 3 and fixed to the movable unit 3 using an adhesive.

The fixed frame 4, which is made of a resin and has a frame-like shape, is disposed outside the movable unit 3. The fixed frame 4 includes outer frames 10 and 11 and four pillars 12. The outer frames 10 and 11, each having a rectangular annular shape, are disposed parallel to each other. The pillars 12 are disposed at corners of the outer frames 10 and 11, extend in the direction of the optical axis L, and connect the outer frames 10 and 11 to each other. A coil 13 is looped over the pillars 12 of the fixed frame 4. The coil 13 is wound around and fixed to the fixed frame 4 so as to face the magnets 7. Ends of the coil 13 are connected to two terminals 14 that are fixed to the outer frame 11.

When an electric current is supplied to the coil 13 through the terminals 14, the magnets 7 and the coil 13 cooperatively generate an electromagnetic force that moves the movable unit 3 in the direction of the optical axis L. By changing the direction of electric current that flows through the coil 13, the movable unit 3 can be made to linearly reciprocate along the optical axis L. The coil 13 is exposed through spaces 4a formed between the pillars 12, so that the coil 13 can face the magnets 7 with a small distance therebetween.

The outer frames 10 and 11 of the fixed frame 4 have openings 10a and 11a at ends thereof in the direction of the optical axis L (direction in which the movable unit 3 moves). In the fixed frame 4, a movable unit passage S extends in the direction of the optical axis L so as to connect the opening 10a and the opening 11a to each other. The movable unit passage S has a rectangular sectional shape with chamfered corners, which substantially coincides with the external shape of the movable unit 3. Chamfered portions C are defined by the inner wall surfaces of the pillars 12, which have substantially triangular sectional shapes.

Magnetic attraction plates 15 and 16, which serve as magnetic bodies (made of, for example, iron), are disposed on the fixed frame 4 at both ends of the movement region of the movable unit 3 with respect to the optical axis L (i.e., each magnetic body 15, 16 is located at a respective end of the movement region of the movable unit 3). The magnetic attraction plates 15 and 16 are fixed to the outer frames 10 and 11, respectively. The magnetic attraction plates 15 and 16 are disposed so as to surround the openings 10a and 11a.

Figure 5:
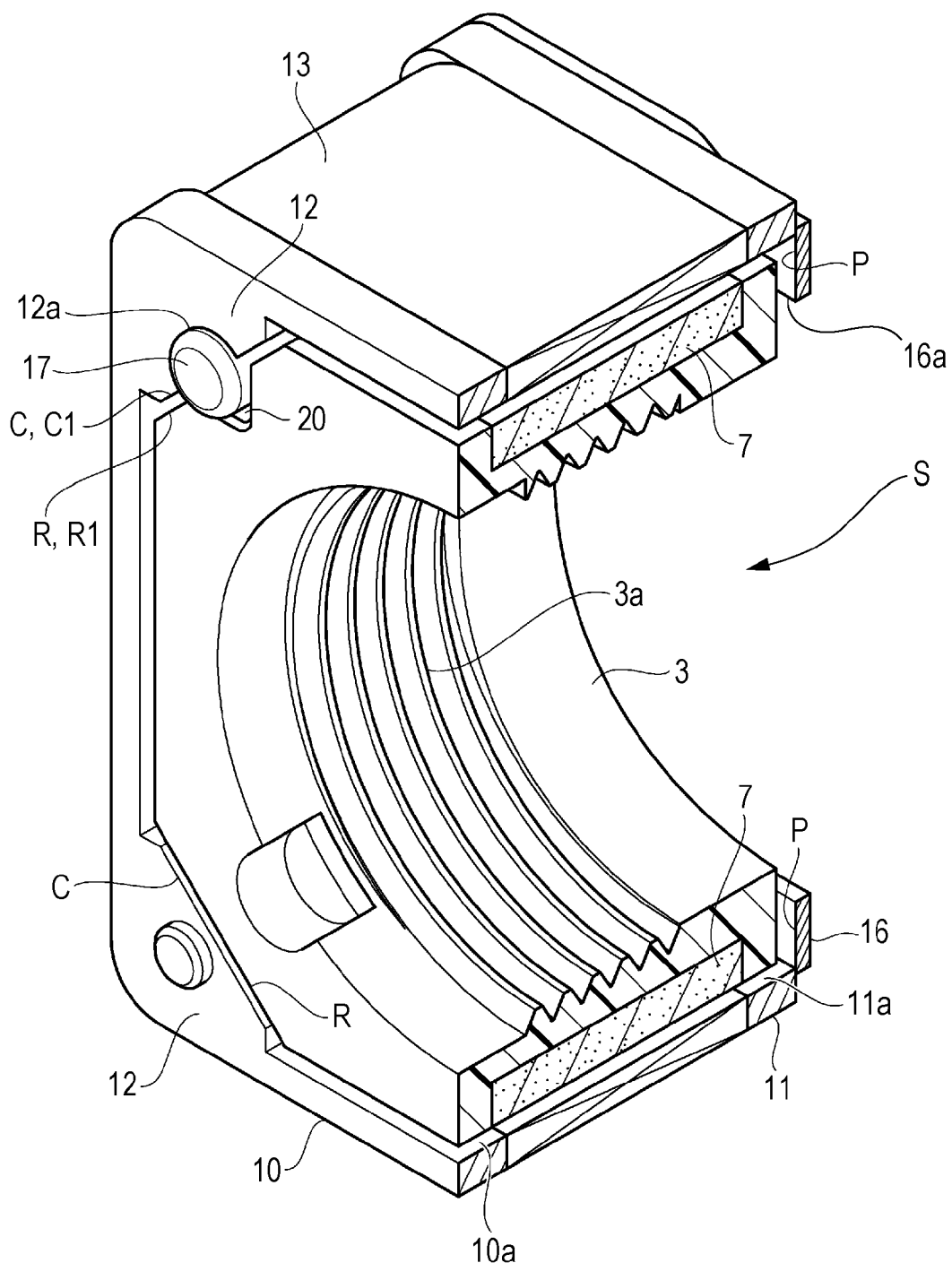
FIG. 5 is a half sectional view illustrating the internal structure of the lens driving device.
Figure 6:
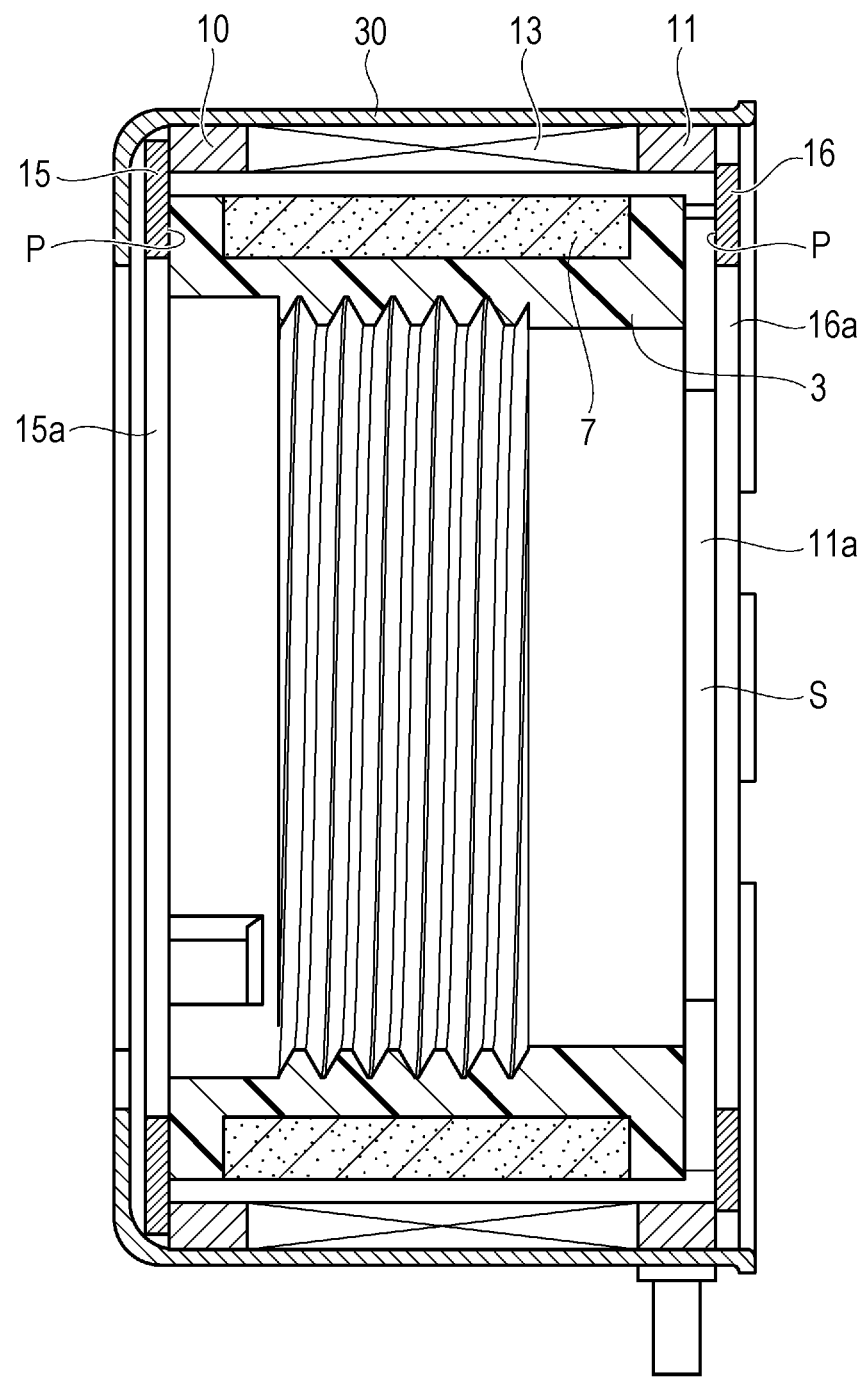
FIG. 6 is a sectional view taken along line VI-VI of FIG. 2.

Referring to FIGS. 5 and 6, the magnetic attraction plates 15 and 16 have openings 15a and 16a, which are smaller than the openings 10a and 11a in the outer frames 10 and 11. Thus, the magnetic attraction plates 15 and 16 extend inward beyond edges of the openings 10a and 11a. Inner peripheral edge portions P of the magnetic attraction plates 15 and 16 protrude so as to cover the peripheral edges of the openings 10a and 11a and so as to face the openings 10a and 11a. Therefore, the inner peripheral edge portions P and the magnets 7 face each other in the direction of the optical axis L, and thereby magnetic connection between the magnets 7 and the magnetic attraction plates 15 and 16 can be securely established. Moreover, the movable unit 3 can be made to abut against the inner peripheral edge portions P of the magnetic attraction plates 15 and 16 when the movable unit 3 reciprocates, so that the magnetic attraction plates 15 and 16 can function as stoppers for the movable unit 3. Thus, the movable unit 3 can be reliably stopped at the front end and at the back end during an autofocus operation (see FIGS. 6 and 7).

The space occupied by the magnetic attraction plates 15 and 16 can be minimized because the magnetic attraction plates 15 and 16 have plate-like shapes as described above, which is advantageous in reducing the size of the lens driving device 1. Moreover, because the magnetic attraction plates 15 and 16 are disposed so as to surround the openings 10a and 11a in the fixed frame 4, the size of the magnetic attraction plates 15 and 16 can be increased, and thereby magnetic attraction to the magnets 7 of the movable unit 3 can be increased. Thus, the position of the movable unit 3 can be retained more securely.

Figure 4:
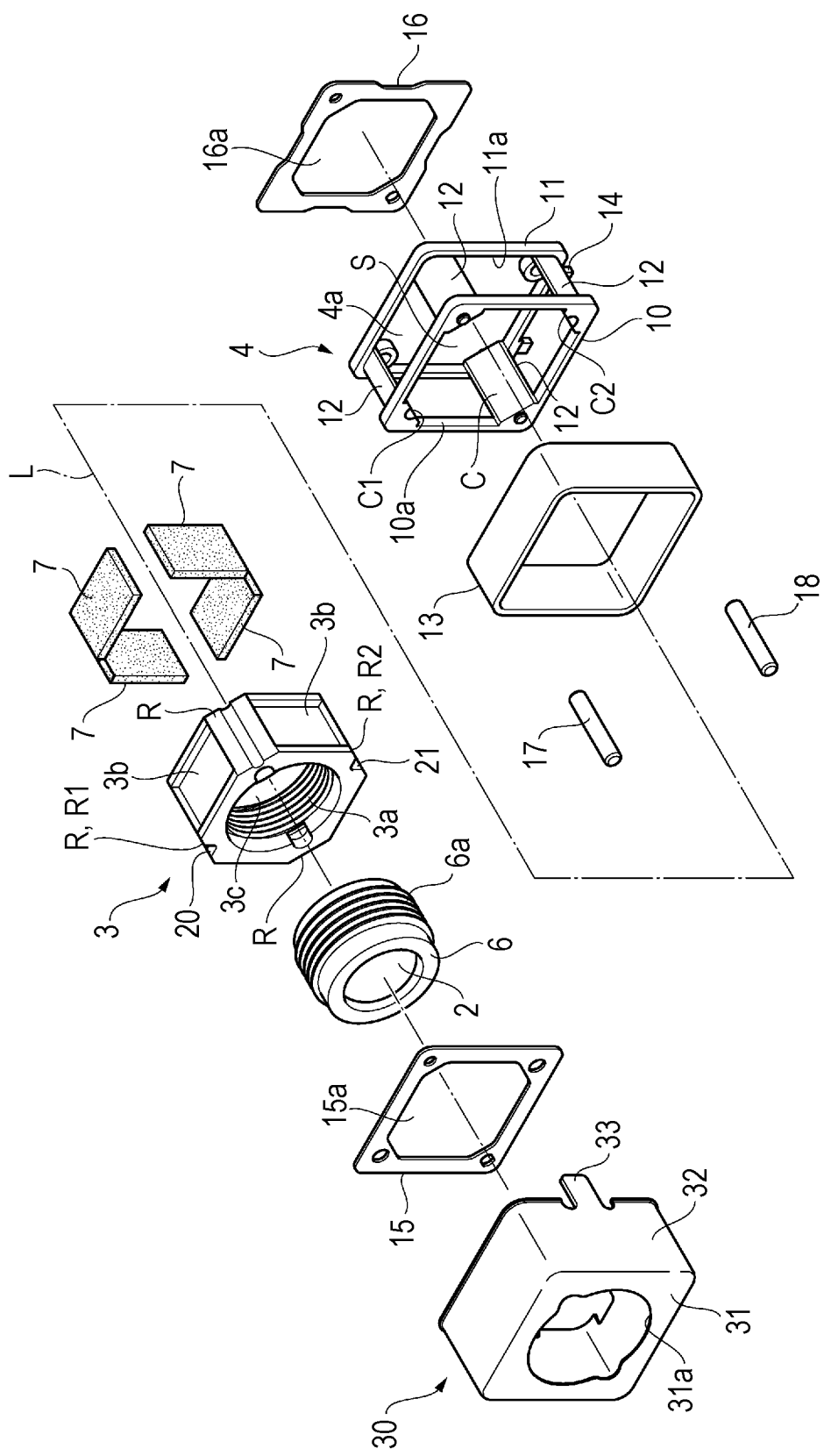
FIG. 4 is an exploded perspective view of the lens driving device illustrated in FIG. 1.

Referring to FIGS. 4 and 5, guide pins 17 and 18 are disposed in the movable unit passage S so as to extend parallel to each other in the direction of the optical axis L. The guide pins 17 and 18 are examples of cylindrical guide members, and the movable unit 3 slides along the guide pins 17 and 18. The chamfered portions C of the movable unit passage S, which has a rectangular sectional shape with chamfered corners, are disposed so as to be symmetric to each other about the central axis of the movable unit passage S (the optical axis L). The guide pins 17 and 18 are disposed in a chamfered portion C1 and a chamfered portion C2 that face each other. In the chamfered portions C1 and C2, guide pin containing recesses 12a, which have semicircular sectional shapes and extend in the direction of the optical axis L, are formed. Both ends of the guide pins 17 and 18 are held by being interposed between the magnetic attraction plates 15 and 16.

The movable unit 3 has a rectangular shape with chamfered corner portions R, which extend in the direction of the optical axis L. The corner portions R are disposed so as be symmetric about the optical axis L, and each of the corner portions R faces a corresponding one of the chamfered portions C of the movable unit passage S. V-grooves 20 and 21, which extend in the direction of the optical axis L, are formed in the corner portions R1 and R2, which are the corner portions R that face the chamfered portions C1 and C2. The guide pins 17 and 18 are in line-contact with the wall surfaces of the V-grooves 20 and 21, and thereby sliding of the movable unit 3 in the direction of the optical axis L can be reliably performed.

By using the guide pins 17 and 18 as described above, the movable unit 3 can be moved in the optical axis direction smoothly and speedily. Moreover, the movable unit 3 can be prevented from being freely moved in the fixed frame 4 and breakage of the movable unit 3 and the fixed frame 4 can be prevented when a drop impact is applied to the lens driving device 1.

In the present embodiment, the movable unit 3 is guided in the direction of the optical axis L by using the guide pins as guide means. Alternatively, balls may be used as guide means to reduce friction. The number of components may be reduced by forming the guide pins by molding.

Because the movable unit passage S has a rectangular sectional shape with chamfered corners and the movable unit 3 has an external shape that substantially coincides with the sectional shape of the movable unit passage S, the movable unit 3 is not likely to rotate around the optical axis L in the movable unit passage S, and therefore optical axis displacement can be avoided. Moreover, because the guide pins 17 and 18 are disposed in the chamfered portions C1 and C2 of the movable unit passage S, the space occupied by the guide pins 17 and 18 can be appropriately reduced. This is extremely advantageous in reducing the size of the lens driving device 1.

In the lens driving device 1, the magnetic attraction plates 15 and 16 are disposed at both ends of the fixed frame 4 in the movement direction of the movable unit 3 (the direction of the optical axis L). Therefore, when the movable unit 3 moves in the fixed frame 4 to one side (see FIG. 6) or to the other side (see FIG. 7) and reaches a position at either end of the fixed frame 4, the magnets 7 on the movable unit 3 are magnetically attracted to the magnetic attraction plates 15 and 16 on the fixed frame 4 continuously. As a result, the movable unit 3 can be retained at the position even when the coil becomes de-energized.

Figure 7:
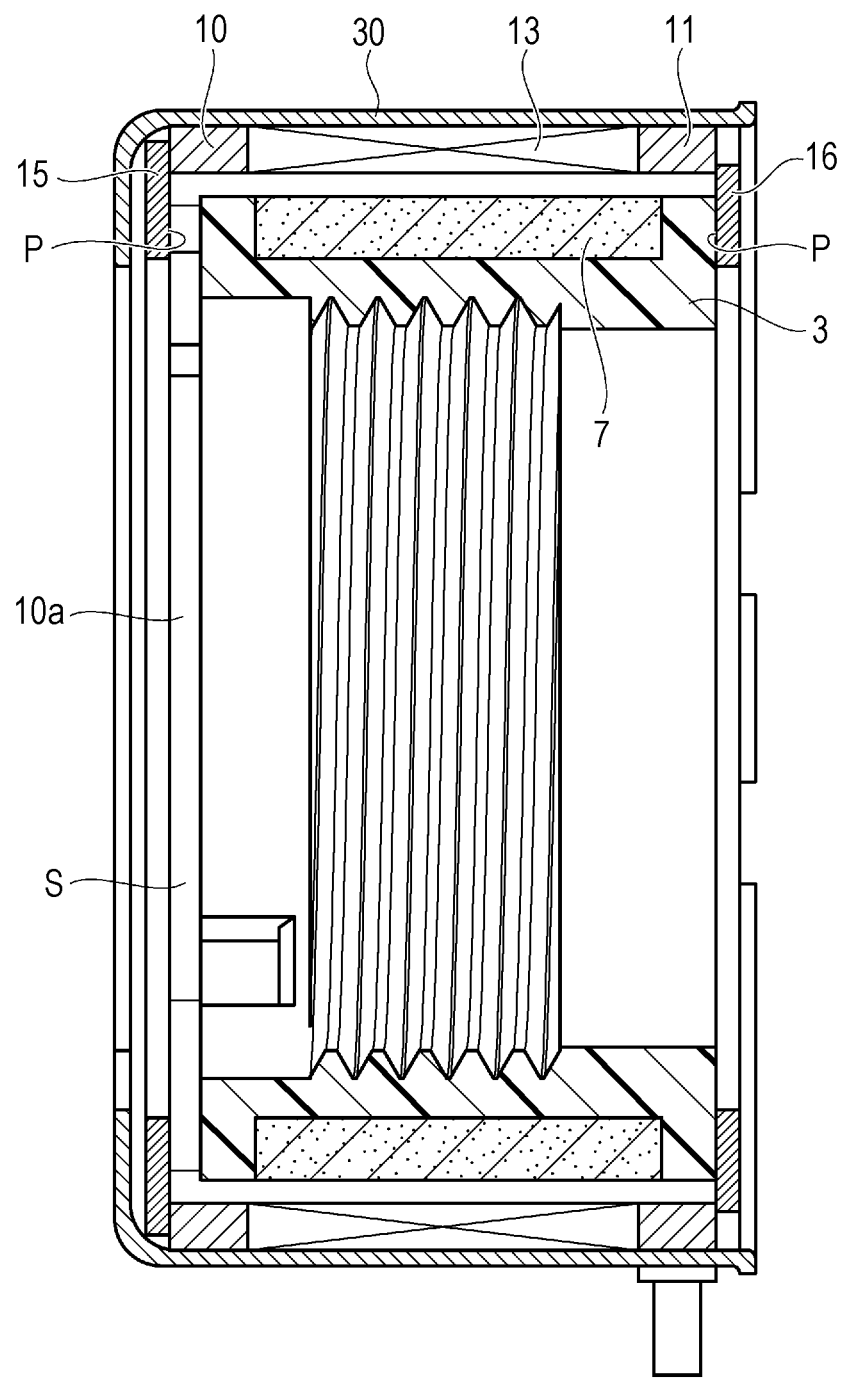
FIG. 7 is a sectional view illustrating a state in which a movable unit has moved.

As illustrated in FIG. 6, when an electric current is supplied through the terminals 14, the magnets 7 and the coil 13 cooperatively generate an electromagnetic force that moves the movable unit 3 forward, and the magnets 7 are attracted to the magnetic attraction plate 15. As a result, even when the coil 13 becomes de-energized, the movable unit 3 can be retained at the front end position. Moreover, as illustrated in FIG. 7, when an electric current having an opposite phase is supplied through the terminals 14, the magnets 7 and the coil 13 cooperatively generate an electromagnetic force that moves the movable unit 3 backward, and the magnets 7 are attracted to the magnetic attraction plate 16. As a result, even when the coil 13 becomes de-energized, the movable unit 3 can be retained at the back end position.

The lens driving device 1, in which the magnets 7 are mounted on the movable unit 3, is of a moving magnet type. Therefore, wires connected to the coil 13 are disposed on the fixed frame 4 side, and thereby breakage of the wires can be prevented and the structure can be easily simplified. Moreover, it is not necessary to provide a space for containing a helical spring in the fixed frame 4 as in existing devices, so that the size of the fixed frame 4 can be reduced by the volume of the space. This is extremely advantageous in reducing the size of the lens driving device 1.

As illustrated in FIGS. 1 to 4, the lens driving device 1 is protected by a cover 30. The fixed frame 4 is covered with a front wall 31 of the cover 30, which has an opening 31a, and four side walls 32 of the cover 30. A pair of left and right claw portions 33 are disposed at the back ends of two side walls 32, and the fixed frame 4 are prevented from coming off by bending the claw portions 33 inward.

What is claimed is:

1. A lens driving device comprising:
a lens;
a movable unit holding the lens; and
a fixed frame holding the movable unit such that the movable unit is linearly movable,
wherein the movable unit includes a magnet shaped to extend along a movement direction of the movable unit,
wherein the fixed frame includes a coil and magnetic bodies, the coil being arranged to face the magnet, and the magnetic bodies being arranged at both ends of a movement region of the movable unit so that each one of the magnetic bodies is at a respective one of the ends of the movement region,
wherein the fixed frame has openings, each one of the openings being located at a respective one of the ends of the movement region of the movable unit, the magnetic bodies being composed of magnetic attraction plates fixed to the fixed frame so as to surround the openings in the fixed frame,
wherein the openings on both sides of the fixed frame are connected to each other through a movable unit passage, guide members being disposed in the movable unit passage so as to extend parallel to each other along the movement direction of the movable unit, and the movable unit being configured to slide along the guide members,
wherein the movable unit passage has a rectangular sectional shape with chamfered corners, chamfered portions of the movable unit passage being positioned symmetrically about a central axis of the movable unit passage, the guide members being disposed in the chamfered portions, and the movable unit having an external shape substantially coinciding with a cross-sectional shape of the movable unit passage.

* * * * *